US008060511B2

(12) United States Patent
Hadley et al.

(10) Patent No.: US 8,060,511 B2
(45) Date of Patent: *Nov. 15, 2011

(54) METHOD FOR EXTRACTING REFERENTIAL KEYS FROM A DOCUMENT

(75) Inventors: Brent L. Hadley, Kent, WA (US);
Patrick J. Eames, Newcastle, WA (US);
Susan C. Chew, Issaquah, WA (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/834,530

(22) Filed: Jul. 12, 2010

(65) Prior Publication Data

US 2010/0316301 A1    Dec. 16, 2010

Related U.S. Application Data

(62) Division of application No. 10/835,903, filed on Apr. 30, 2004, now Pat. No. 7,756,869.

(51) Int. Cl.
*G06F 7/00* (2006.01)
(52) U.S. Cl. .................................. 707/736; 382/190
(58) Field of Classification Search .................. None
See application file for complete search history.

(56) References Cited

U.S. PATENT DOCUMENTS

| 5,444,840 | A | * | 8/1995 | Froessl ................. 1/1 |
|---|---|---|---|---|
| 5,666,490 | A | | 9/1997 | Gillings et al. |
| 5,708,825 | A | | 1/1998 | Sotomayor |
| 5,752,022 | A | | 5/1998 | Chiu et al. |
| 5,781,914 | A | | 7/1998 | Stork et al. |
| 5,787,425 | A | | 7/1998 | Bigus |
| 5,832,530 | A | | 11/1998 | Paknad et al. |
| 5,835,712 | A | | 11/1998 | DuFresne |
| 5,875,263 | A | | 2/1999 | Froessl |
| 5,895,470 | A | | 4/1999 | Pirolli et al. |
| 5,926,565 | A | | 7/1999 | Froessl |
| 6,023,528 | A | | 2/2000 | Froessl |
| 6,070,161 | A | | 5/2000 | Higashio |
| 6,138,129 | A | | 10/2000 | Combs |
| 6,185,549 | B1 | | 2/2001 | Rastogi et al. |
| 6,253,631 | B1 | | 7/2001 | McCain et al. |
| 6,324,533 | B1 | | 11/2001 | Agrawal et al. |
| 6,356,898 | B2 | | 3/2002 | Cohen et al. |
| 6,356,923 | B1 | | 3/2002 | Yano et al. |
| 6,370,521 | B1 | | 4/2002 | Pigos, Jr. et al. |

(Continued)

OTHER PUBLICATIONS

European Examination Report; Application No. 05 742 113.3—1527 dated Dec. 11, 2009; Applicant: The Boeing Company (Ref. 1284P281EP(WO)M).

(Continued)

*Primary Examiner* — Hung Q Pham
*Assistant Examiner* — Hubert Cheung
(74) *Attorney, Agent, or Firm* — Armstrong Teasdale LLP

(57) ABSTRACT

Methods, computer-readable media, and systems for extracting referential keys from a document are provided. A document is parsed to identify at least one key, the key being identified from at least one contextual indication. The key is classified according to a key type, the key type being identified from the contextual indication. The key is extracted and then stored in a location in a structured shell with the location corresponding to the key type. As a result, the key can be found by a search seeking one of the key and the key type allowing a searcher to identify the document from which the key was extracted.

11 Claims, 9 Drawing Sheets

U.S. PATENT DOCUMENTS

| | | |
|---|---|---|
| 6,424,982 B1 | 7/2002 | Vogel |
| 6,429,880 B2 | 8/2002 | Marcos et al. |
| 6,430,563 B1 | 8/2002 | Fritz et al. |
| 6,496,208 B1 | 12/2002 | Bernhardt et al. |
| 6,516,321 B1 | 2/2003 | De La Huerga |
| 6,574,644 B2 | 6/2003 | Hsu et al. |
| 6,584,469 B1 | 6/2003 | Chiang et al. |
| 6,654,737 B1 | 11/2003 | Nunez |
| 6,658,623 B1 | 12/2003 | Schilit et al. |
| 6,658,624 B1 | 12/2003 | Savitzky et al. |
| 6,665,669 B2 | 12/2003 | Han et al. |
| 6,684,208 B2 | 1/2004 | Kil et al. |
| 6,691,120 B1 | 2/2004 | Durrant et al. |
| 6,718,329 B1 | 4/2004 | Selvin et al. |
| 6,745,181 B1 | 6/2004 | Chang et al. |
| 6,771,816 B1 | 8/2004 | Gaither |
| 6,910,184 B1 | 6/2005 | Yano et al. |
| 7,003,522 B1 * | 2/2006 | Reynar et al. ............... 707/736 |
| 7,299,972 B2 | 11/2007 | Kelley et al. |
| 7,606,741 B2 | 10/2009 | King et al. |
| 7,610,274 B2 | 10/2009 | Gotoh |
| 7,818,308 B2 * | 10/2010 | Carus et al. ............... 707/705 |
| 2002/0023124 A1 | 2/2002 | Murayama |
| 2002/0049705 A1 | 4/2002 | Haviv-Segal et al. |
| 2002/0065857 A1 | 5/2002 | Michalewicz et al. |
| 2003/0131312 A1 | 7/2003 | Dang |
| 2005/0097080 A1 | 5/2005 | KethiReddy et al. |
| 2005/0222975 A1 | 10/2005 | Nayak et al. |
| 2005/0246351 A1 | 11/2005 | Hadley et al. |
| 2005/0286805 A1 | 12/2005 | Yoshida |
| 2005/0289159 A1 | 12/2005 | Hadley et al. |
| 2005/0289161 A1 | 12/2005 | Hadley et al. |
| 2005/0289185 A1 | 12/2005 | Hadley et al. |
| 2005/0289447 A1 | 12/2005 | Hadley et al. |
| 2006/0004728 A1 | 1/2006 | Gotoh |
| 2006/0023945 A1 | 2/2006 | King et al. |
| 2006/0026140 A1 | 2/2006 | King et al. |
| 2007/0300142 A1 | 12/2007 | King et al. |

OTHER PUBLICATIONS

Lee, et al., "Preparations for Semantics-Based CML Mining", IEEE, p. 345-352, 2001.
Jenkins, et al., "Adaptive Automatic Classification on the Web", IEEE, pp. 504-511, 2000.
Office Action U.S. Appl. No. 10/835,903 mailed May 30, 2007.
Final Office Action U.S. Appl. No. 10/835,903 mailed Oct. 17, 2007.
Office Action U.S. Appl. No. 10/835,903 mailed Dec. 18, 2007.
Final Office Action U.S. Appl. No. 10/835,903 mailed Jun. 10, 2008.
Office Action U.S. Appl. No. 10/835,903 mailed Dec. 16, 2008.
Final Office Action U.S. Appl. No. 10/835,903 mailed May 26, 2009.
Office Action U.S. Appl. No. 10/835,903 mailed Nov. 5, 2009.
Notice of Allowance U.S. Appl. No. 10/835,903 dated May 18, 2010.

* cited by examiner

METHOD FOR EXTRACTING REFERENTIAL KEYS FROM A DOCUMENT

CROSS-REFERENCE TO RELATED APPLICATIONS

This application is a divisional application of U.S. patent application Ser. No. 10/835,903, filed Apr. 30, 2004 titled Methods and Apparatus for Extracting Referential Keys from a Document, which is hereby incorporated by reference in its entirety.

FIELD OF THE INVENTION

This invention relates generally to information extraction and, more specifically, to processing documents to enhance access to information stored in the documents.

BACKGROUND OF THE INVENTION

People often need to access information that is recorded in documents. Such documents may range in length from a single page to many volumes. Certainly, the longer the documents are, the more difficult it is to access the specific information desired. As a result, long or complex documents include multiple tables and indices to facilitate hierarchical and keyword searches for the information of interest. These tables and indices are time-consuming to create. Furthermore, although the tables and indices are helpful in locating information, using them is time-consuming since each page referred to in the table or index must be individually examined to find the entry of interest. The foregoing may be repeated numerous times before the substantive entry of interest is found.

The proliferation of computers has revolutionized how information is accessed. Accordingly, computer-readable documents may now be searched using various software routines for terms of interest in the document. In particular, hypertext linking has enabled referencing and cross-referencing of key terms simply by using a pointing device to select a point of interest in a document.

Despite the great advantages that computers permit in accessing and retrieving information, processes for information retrieval still can be improved. For example, creating a hyper-link to a source document involves human intervention to identify the term with which the link will be created and associating it with the link to the related information. Further, to create hyper-linked information, all the documents or at least those documents containing the links need to be computer-readable documents. As a result, a non-computer-readable document may be scanned so that it is computer-viewable, but unless the document is computer-readable such as a text or graphics document, it is generally not possible to associate links with portions of the document.

Similarly, even though a referenced document need not be computer-readable to be accessed from a link, if the reference target is not computer-readable, then a person linking to the document may be required to manually navigate through the target document to find the information of interest. Certainly, the task becomes even more complicated if one desires information in both documents and needs to switch back and forth between the documents. In such cases, to avoid the difficulty of navigating back and forth, a user desiring portions of such documents will typically print the needed documents or parts of the documents. When users print such documents instead of accessing them on the computer, this clearly undermines one of the objectives of making such documents accessible by computer.

To avoid the complexities of moving back and forth between documents, one possibility is to extract information from documents that are expected to be relevant. Unfortunately, removing only the content from the documents may present other problems. For example, some regulatory agencies require that extracted content be verified as accurately including the content of the original document before it can be used. This verification is a time-consuming and costly process. In addition, extraction of content also may obliterate inferential information a user might otherwise obtain from the document. Such inferential information might exist as an interrelationship between parts, or as an annotation regarding other parts that might be useful, and other similarly useful information. Extracting information expected to be relevant thus may obliterate other useful information.

SUMMARY OF THE INVENTION

The various embodiments of the present invention are useful in mining documents to identify keys that facilitate the creation of references within the documents and that may also form a basis for links between documents. The various embodiments exploit the fact that that documents of certain types adhere to formatting standards that may include titles, section headings, and other parts of the document that are useful for navigating to and within the document. The various embodiments may also utilize pattern formats that may be present in documents of various types, such as character patterns that may include a number of characters having expected separators so that keys may be identified when that pattern appears on the page. Once these parts of the document representing potentially useful navigational keys have been identified, the keys are stored in a structured format associated with the original document to facilitate linking the keys with related documents. In one non-limiting example, embodiments of the present invention are used to mine a if portable document format (.pdf or PDF) type document to find textual and graphical keys in the document, using optical character recognition as needed to extract text from graphically-presented keys, and to store the keys in an extensible markup language (XML) document to facilitate creating links to the keys in the original .pdf document.

More particularly, embodiments of the present invention provide methods, computer-readable media, and systems for extracting referential keys from a document. A document is parsed to identify at least one key, the key being identified from at least one contextual indication. The key is classified according to a key type, the key type being identified from the contextual indication. The key is extracted and then stored in a location in a structured shell with the location corresponding to the key type. As a result, the key can be found by a search seeking one of the key and the key-type allowing a searcher to identify the document from which the key was extracted.

BRIEF DESCRIPTION OF THE DRAWINGS

The preferred and alternative embodiments of the present invention are described in detail below with reference to the following drawings.

DETAILED DESCRIPTION OF THE INVENTION

The present invention relates generally to a system and method for linking related documents and, more specifically, to identifying, extracting, and collecting keys used in linking the related documents. Many specific details of certain embodiments of the invention are set forth in the following description and in FIGS. 1-9 to provide a thorough understanding of such embodiments. One skilled in the art, however, will understand that the present invention may have additional embodiments, or that the present invention may be practiced without several of the details described in the following description.

More particularly, embodiments of the present invention provide methods, computer-readable media, and systems for extracting referential keys from a document. A document is parsed to identify at least one key, the key being identified from at least one contextual indication. The key is classified according to a key type, the key type being identified from the contextual indication. The key is extracted and then stored in a location in a structured shell with the location corresponding to the key type. As a result, the key can be found by a search seeking one of the key and the key-type allowing a searcher to identify the document from which the key was extracted.

Using prior knowledge of the formats employed by authors in creating documents, for a given document format (e.g., .pdf files) and document type (e.g., aircraft maintenance manuals), the document information mining tool reviews the document for elements an author of the document has included that can be used to navigate to and within the document. For example, the document mining tool identifies titles, headers, footers, page numbers, off-page references, annotations to graphics, and other authored elements that a human reader of the document might use to navigate for additional information. The document mining tool identifies these navigational attributes automatically by dissecting the document. The information mined is then stored using a suitable structured format, such as an XML document, allowing the mined information to be used as keys or tags to support linking to other documents. The document mining tool is further suitably equipped with an optical character reading (OCR) capability to analyze text that appears in graphic form in order to mine it from the document.

The document information mining tool thus provides a low-level, literal extraction process by parsing a document, identifying sections of the document that can be used as navigational points to navigate to, from, and throughout the document, and storing the mined information in a useful structure.

Figure 1:
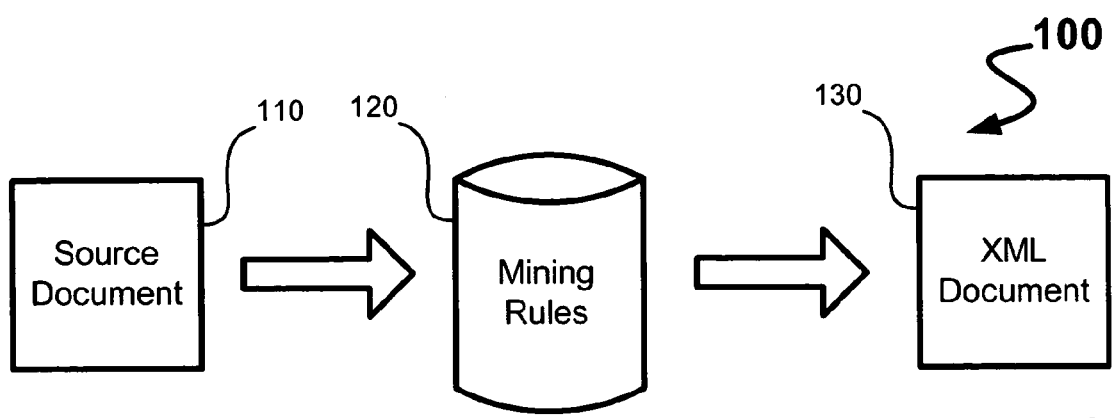
FIG. 1 is a block representation of an embodiment of the present invention.

FIG. 1 is a block diagram of a generalized system 100 for mining a source document 110 according to an embodiment of the invention. The document 110 is subjected to examination according to mining rules 120 directed to identify and extract various navigational keys, as will be described in greater detail below. The extracted keys are subsequently stored in a structured format 130. The structured format 130 may include an XML document, although it will be appreciated that the extracted keys may also be stored in a substantive content-based document. In one particular embodiment, the keys are stored in a structured format used to facilitate navigation to and within the source document. In still another particular embodiment, The mined information is used to navigate through the existing documents to facilitate access to the complete, underlying documents.

Referring still to FIG. 1, in another particular embodiment, keys may be created by a user and transferred to the mining rules 120. The source document 110 may then be parsed to locate at least one portion of the document 110 that includes a contextual indication corresponding to the key created by the user. The user may then review the information located within the at least one portion identified during the parsing.

Figure 2:
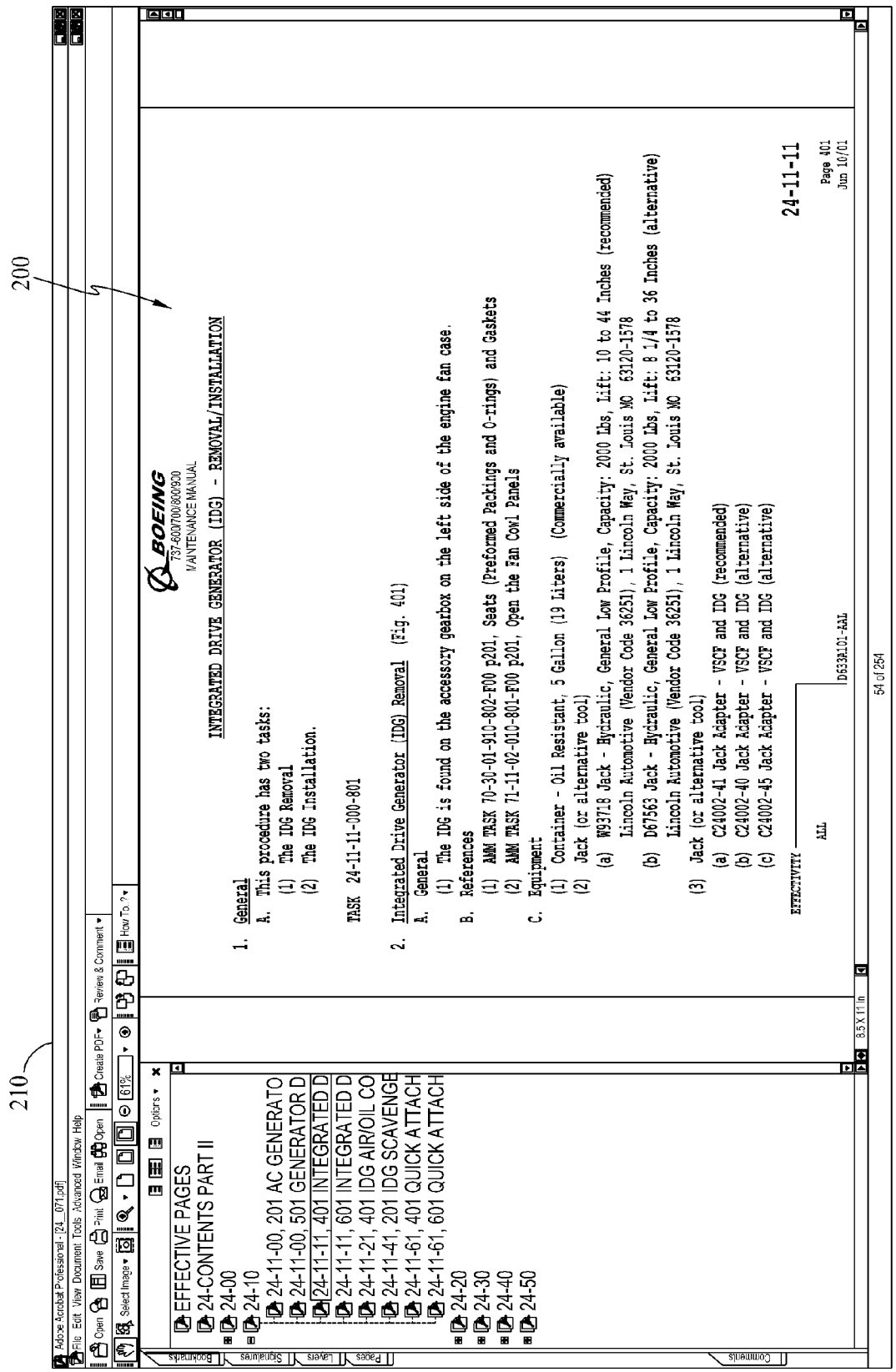
FIG. 2 is a document to be mined according to an embodiment of the present invention.

FIG. 2 shows a sample document 200, which is a page selected from an aircraft maintenance manual (AMM). The document 200 is formatted as a .pdf document and presented on a .pdf reader 210. It will be appreciated that the document 200 could have been generated from a computer-readable document or scanned from a printed document. For purposes of this description, a computer-readable document is one in which characters and figures are generated for display on a computer screen from character and figure representations. In contrast, non-computer-readable documents are documents received in image form because they were scanned into or otherwise stored in a computing system in an image format stored such as rasterized data. The sample document 200 represents a document that will be mined to extract the keys in the document, which may include titles, task designations, and other information, that might be useful in navigating to, from, and within the document 200.

Figure 3:
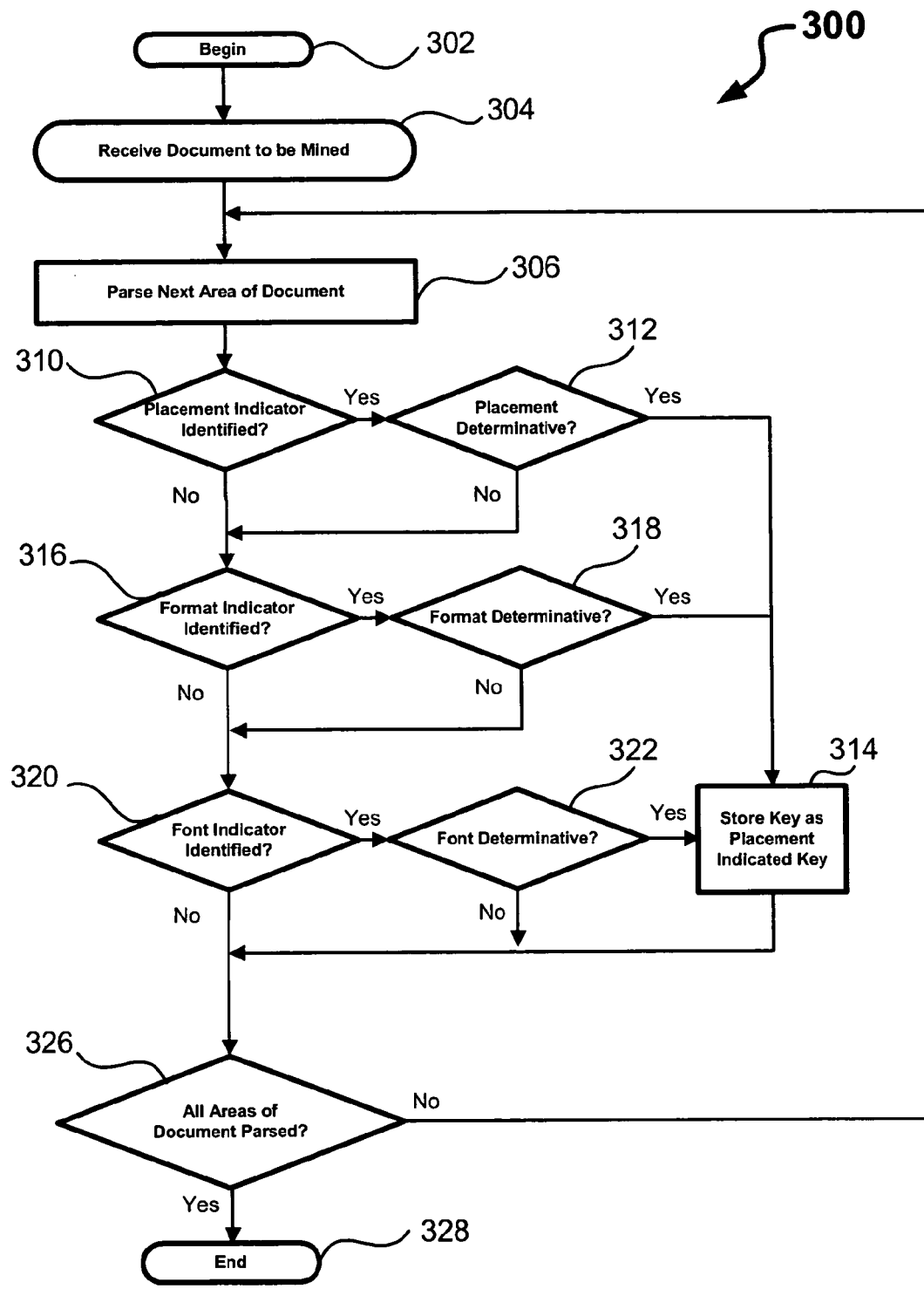
FIG. 3 is a flowchart of a routine for mining a document according to an embodiment of the present invention.
Figure 4:
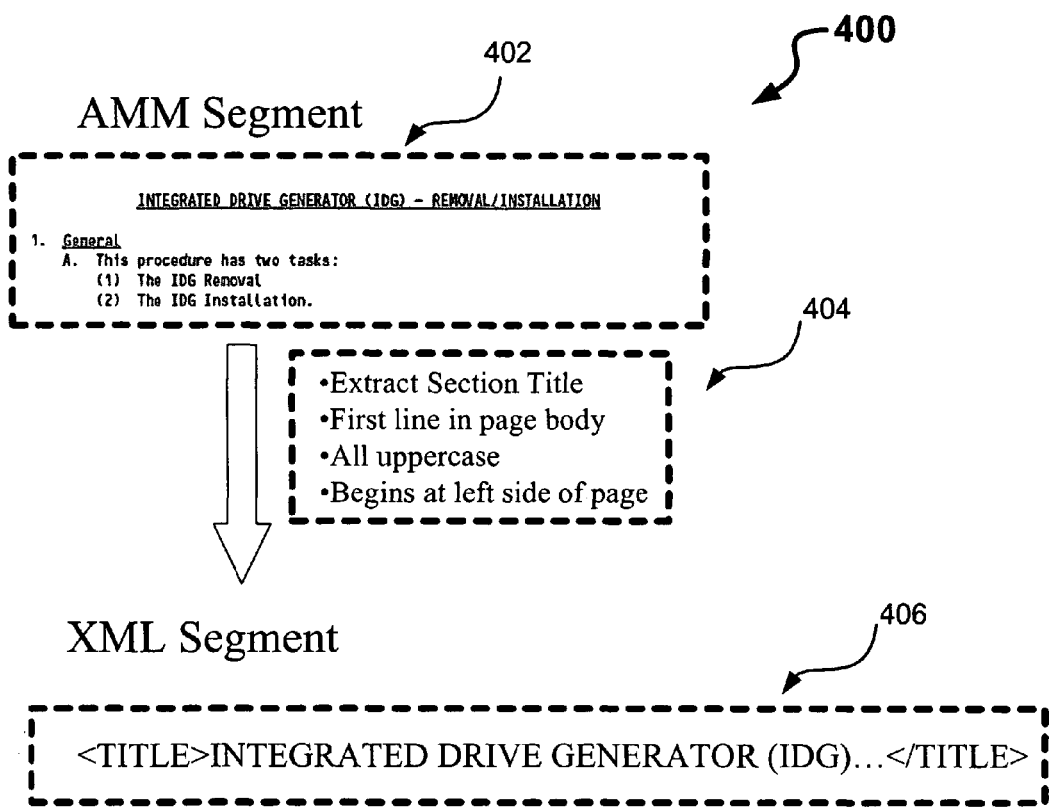
FIGS. 4-7 are examples of portions of documents mined to extract keys into a structured format.
Figure 5:
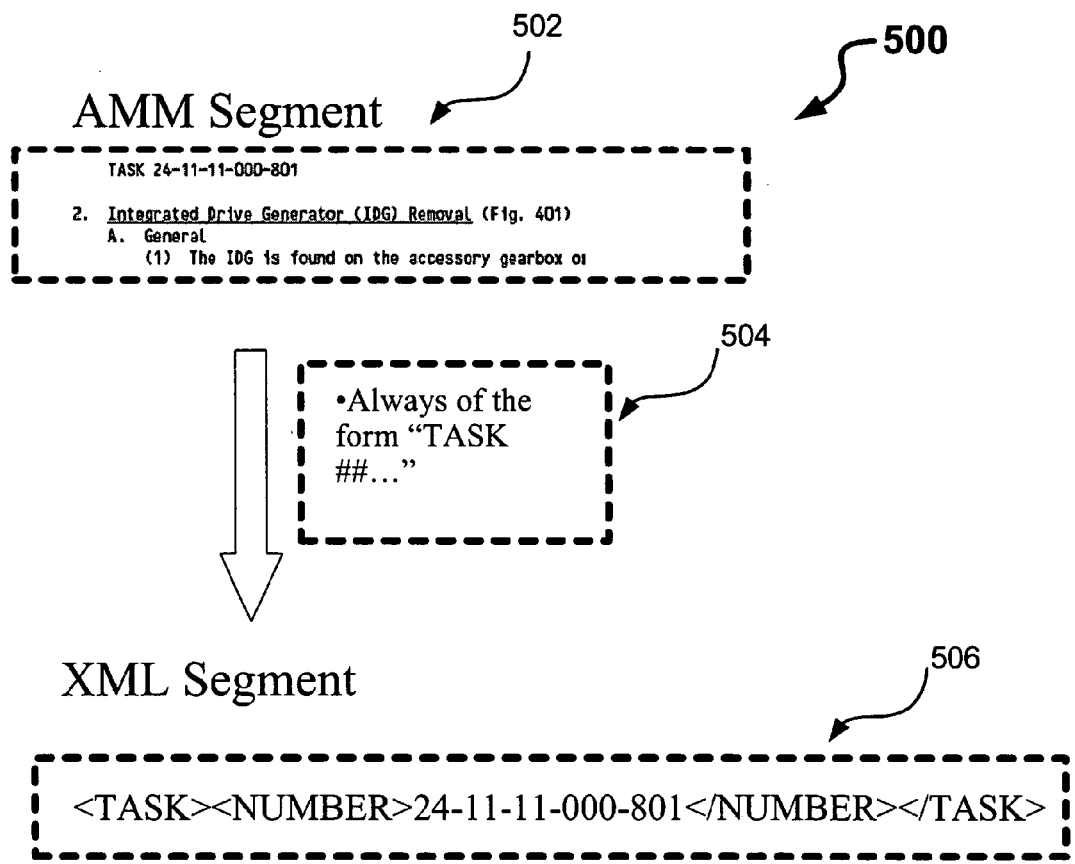
Figure 6:
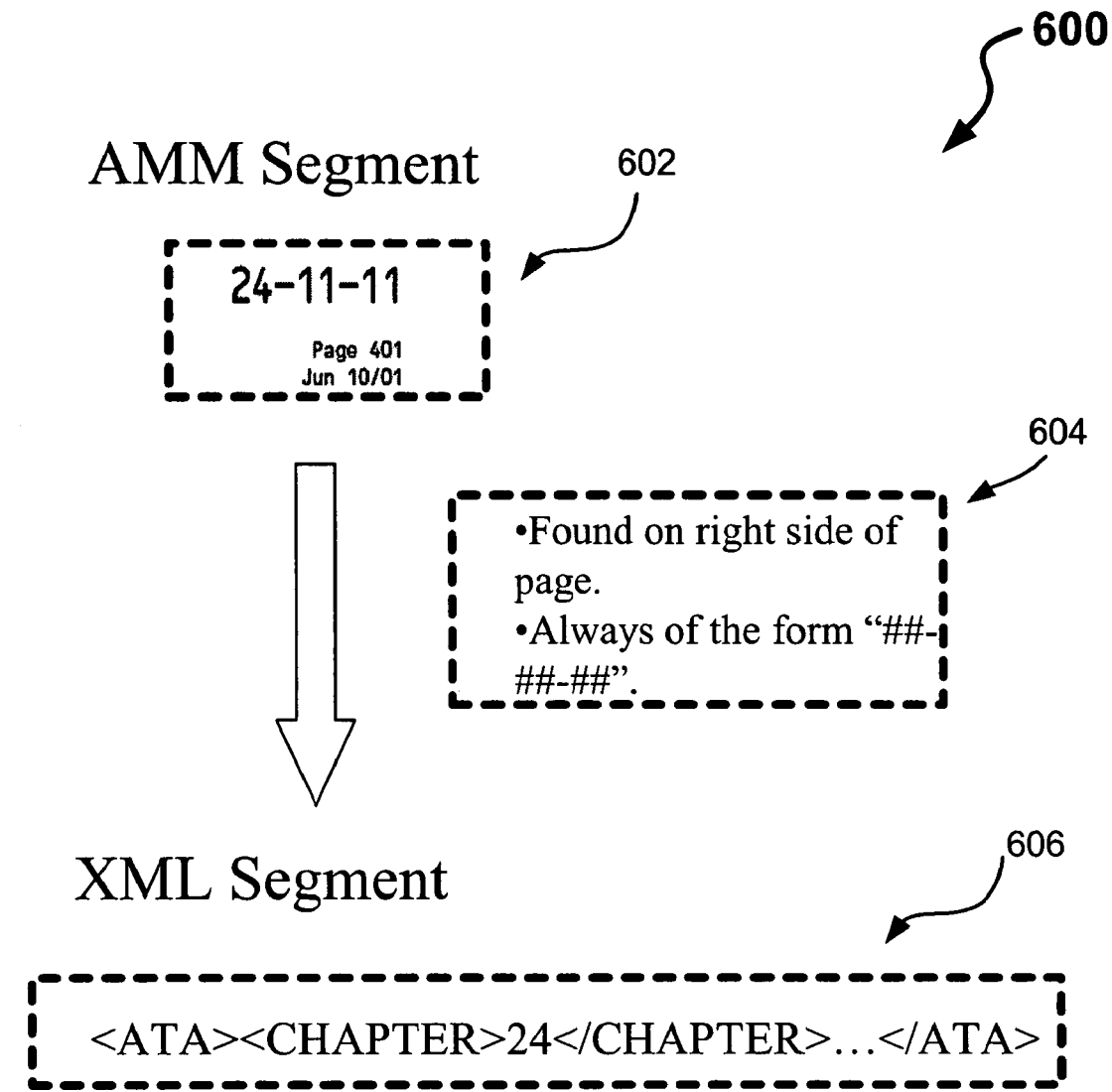
Figure 7:
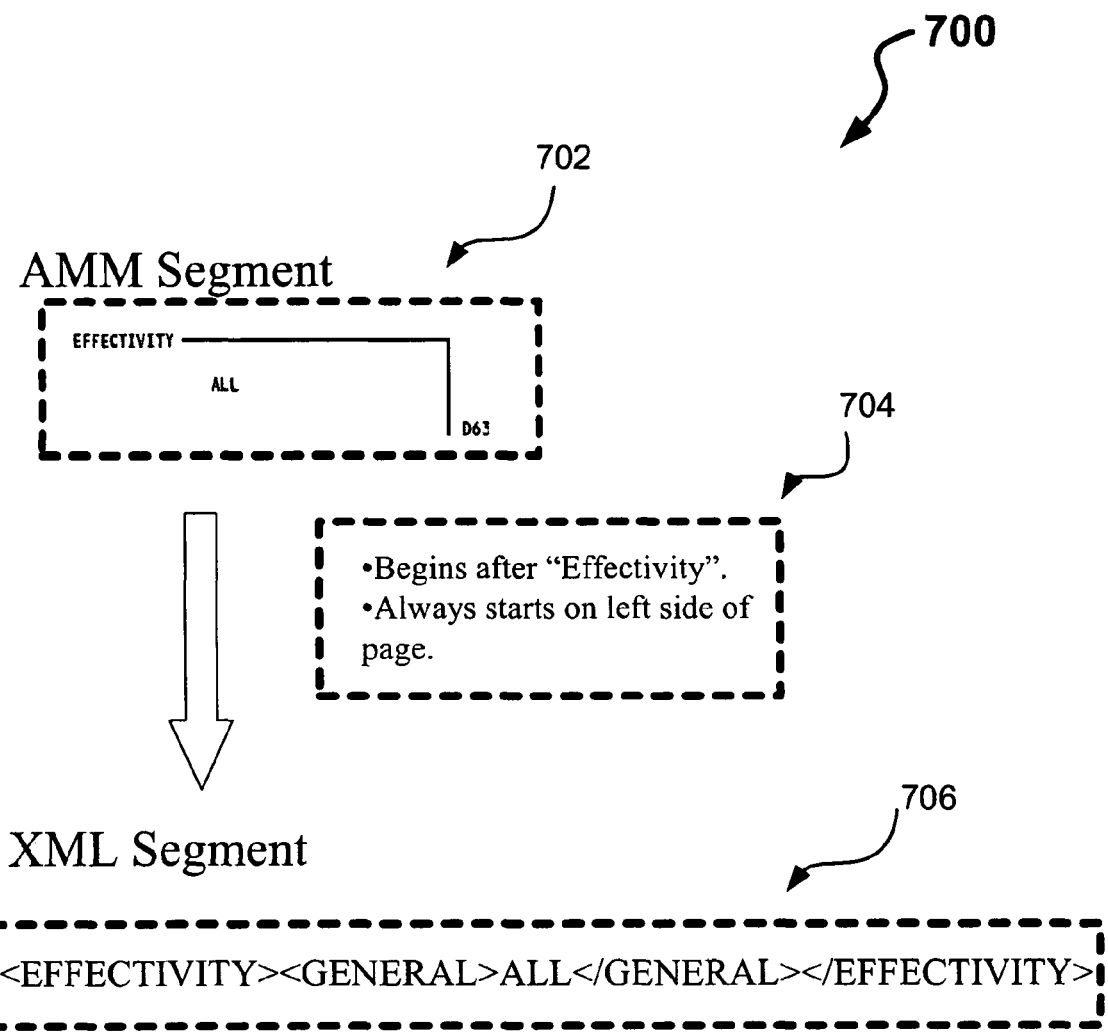

FIG. 3 is a generalized flowchart of a method 300 for mining a document such as the sample document 200 (FIG. 2) according to an embodiment of the invention. The routine 300 begins at a block 302. At a block 304, the document to be mined is received. As previously described, the document may be a computer-readable document or non-computer-readable image-type document. At a block 306, a next area of a document is parsed. The exemplary routine 300 parses a document area by area. However, alternatively, the document could be parsed looking for particular features of the document as will be further described below.

At a decision block 310 it is determined if a placement indicator is identified. A placement indicator may indicate presence of a title, a header, footer, a page number, or another key having relevance as indicated by the position of the key on a page. Accordingly, the manner in which the key is detected may be based upon generalized knowledge of the formatting methods used in a document, or upon tribal knowledge of the formatting methods, or other specific document formatting rules. Generalized knowledge, for example, includes knowledge that indicates that a series of numerals centered or in a corner of a header or footer of a series of pages represent page numbers. General knowledge also may include, for example, that a term appearing at a top of a page generally includes a title. By contrast, tribal knowledge includes knowledge known to a group of persons familiar with a specific type of document. For example, in certain industries or organizations, it may be common practice to place a subject identifier in a header or footer of each page, even though the inclusion of that key may not be indicated by a specific rule. Finally, specific document formatting rules are rules literally dictated by document conventions. For example, it may be an established practice in an industry or organization to position system identifiers on a page of a document in a generally similar location. For example, the format used in legal briefs submitted to courts include titles, page numbers, and other elements placed in generally similar locations according to rules specified by the courts.

Still referring to FIG. 3, once a placement indicator is identified at the decision block 310, the routine 300 proceeds to a decision block 312 where it is determined if the placement is determinative of what type of key has been identified. One area of a document could include a placement-indicated key, a format-indicated key, and a font-indicated key, such as, for example, if footer includes both a page number and title or other identifier. The position of a numeral alone, such as in a part of a header reserved for a particular identifier may alone be determinative. On the other hand, other aspects of the key may have to be considered. If it is determined at the decision block 312 that placement is determinative, the routine 300 proceeds to a block 314 where the key is extracted and stored in a structured format. If the document is a computer-readable document, characters representing the key are copied. On the other hand, if the document is a non-computer-readable image-type document as previously described, an optical character recognition (OCR) routine is invoked to scan the identified key to extract the characters from the key.

If a placement indicator is not identified or placement alone is not determinative, the routine proceeds to a decision block 316 where it is determined if a format indicator is identified. A format-indicated key may include a string of digits identifiable because of their format. For example, a number including three numbers followed by a separator such as a dash, followed by three more numbers, another dash, and four more numbers might be expected to be a phone number. A number including three numbers followed by a dash, followed by two more numbers followed by another dash, followed by four more numbers might be expected to be a Social Security number. In a further example, a string of characters followed by an "@" symbol followed by another string of characters including at least one period might be expected to be an e-mail address. Accordingly, a type of key can be determined based upon the format.

Once a format indicator is identified at the decision block 316, the routine 300 proceeds to a decision block 318 where it is determined if the format is determinative of what type of key has been identified by itself or in combination with the placement indicator. If it is determined at the decision block 318 that format alone or with the placement is determinative, the routine 300 proceeds to a block 314 where the key is extracted and stored in a structured format. If the document is a computer-readable document, characters representing the key are copied. On the other hand, if the document is a non-computer-readable image-type document as previously described, an optical character recognition (OCR) routine is invoked to scan the identified key to extract the characters from the key.

If placement or format indicators are not identified, or they are not determinative alone, the routine proceeds to a decision block 320 where it is determined if a font indicator is identified. A font-indicated key may include a key having a type signified by its font or typeface. For example, according to commonly accepted document conventions, information that is underlined, or that appears in bold type, or is presented in an enlarged font, or any combination of the foregoing may represent a title, a part name, a document identifier, or similar information.

Once a font indicator is identified at the decision block 320, the routine 300 proceeds to a decision block 322 where it is determined if the font is determinative of what type of key has been identified by itself or in combination with other indicators. If it is determined at the decision block 322 that format alone or in combination with other indicators is determinative, the routine 300 proceeds to a block 314 where the key is extracted and stored in a structured format. If the document is a computer-readable document, characters representing the key are copied. On the other hand, if the document is a non-computer-readable image-type document as previously described, an optical character recognition (OCR) routine is invoked to scan the identified key to extract the characters from the key.

If indicators are not identified or are not determinative, the routine proceeds to a decision block 326 where it is determined if all areas of the document have been parsed. If not, the routine loops to the block 306 where the next area of the document will be parsed. On the other hand, if all areas of the document have been parsed, the routine 300 ends at a block 328.

Although FIG. 3 shows a particular sequential ordering of the steps 310, 316 and 320, it will be appreciated that the order of the steps 310, 316 and 320 may be altered to suit a particular application. Moreover, the steps 310, 316 and 320 may also be executed in parallel, so that keys based on placement, format and font may be identified simultaneously.

FIGS. 4-7 illustrate examples of how keys of interest are mined from a document. The examples 400, 500, 600, and 700 from FIGS. 4, 5, 6, and 7, respectively show examples of keys being extracted from a page of an aircraft maintenance manual (AMM). The keys are extracted and then stored in a structured document that, in these examples, are XML documents.

Example 400 (FIG. 4) shows a key being extracted from a document segment 402. In particular, the key includes a section title, "INTEGRATED DRIVE GENERATOR (IDG)—REMOVAL/INSTALLATION." The key is identified by rules 404 recognizing a combination of indicators using general, tribal, and/or other knowledge. In terms of placement, the potential key begins at a left side of a page and is a first line of a page body. In terms of font, the potential key is all UPPERCASE. The potential key is thus identified as a section title and identified as a key of interest. The key is extracted and stored in a structured format 406, in this case an XML document, where the key is designated as a title so that if can be located for navigation purposes.

Example 500 (FIG. 5) shows a second key being extracted from a document segment 502. The key includes a task identifier, an expected and sought-after key in an AMM. The task identifier is determined in this case by format indicators. The task identifier includes a string of two digits, two digits, two digits, three digits, and three digits all separated by dashes. Accordingly, a rule 504 identifies this format as a task identifier, which is thus identified as a key. The key is extracted and stored in an XML document 506 where the key is designated as a task number so that it can be located for navigation purposes.

Example 600 (FIG. 6) shows a third key being extracted from a document segment 602. The key includes a chapter number (24-11-11), which may be another expected and sought-after key in an AMM. The chapter number is determined in this case by placement and format indicators. In the present example. the chapter number is always on a right side of a page, and is always in the form of two digits, two digits, and two digits separated by dashes. The present example also includes a page block (401) and a revision date (Jun. 10, 2001) that follow the formatted chapter number. Again, a rule 604 identifies the placement, and format indicators in the document segment 602 to identify the key. The key is then extracted and stored in an XML document 606 where the key is designated as a chapter number so that it can be located for navigation purposes. It will be appreciated that upon finding a formatted key such as the chapter number, the chapter number maybe further subdivided and stored in its constituent parts, including chapter (24), section (11), subject (11), and page block (401).

Example 700 (FIG. 7) shows a fourth key being extracted from a document segment 702. The key includes a particular substantive section that, in this case, is "Effectivity" that is used to designate the applicability of a selected portion of the AMM to a particular aircraft. The substantive section is determined in this case by placement and format indicators. In the present example, the substantive section of interest is always on a left side of a page (a placement indicator) and always follows the term "Effectivity." As in the previous example, a rule 704 identifies the potential key as the substantive description "Effectivity" and identifies it as a key of interest. The key is extracted and stored in an XML document 706 where the key is designated as "Effectivity" so that it can be located for navigation purposes.

Figure 8:
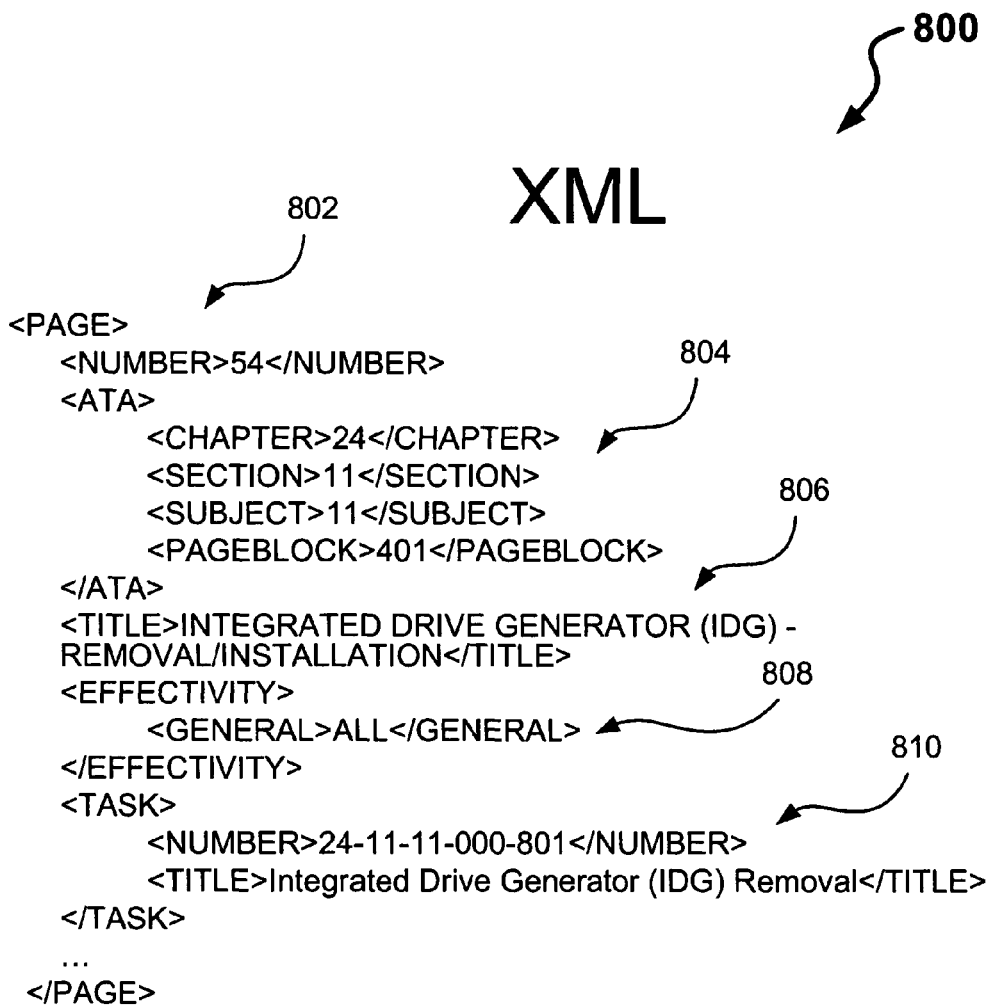
FIG. 8 is a structured format collecting a collection of keys mined from a document.

FIG. 8 shows an XML document 800 that collects the extracted keys. The XML document 800 shows a page number 802, a chapter number 804 subdivided into its constituent parts, a title 806, a substantive section 808 (Effectivity), and a task identifier 810. The keys 802, 804, 806, 808, and 810 all are in a computer-readable format and are associated with the original document from which the keys 802, 804, 806, 808, and 810 were extracted. Thus, the XML document 800 can be searched or otherwise accessed to find the keys 802, 804, 806, 808, and 810 of interest. The keys 802, 804, 806, 808, and 810 are in turn linked to the document 800 from which they were drawn. Thus, the mining tool facilitates access to the document of interest and the portion of interest.

Figure 9:
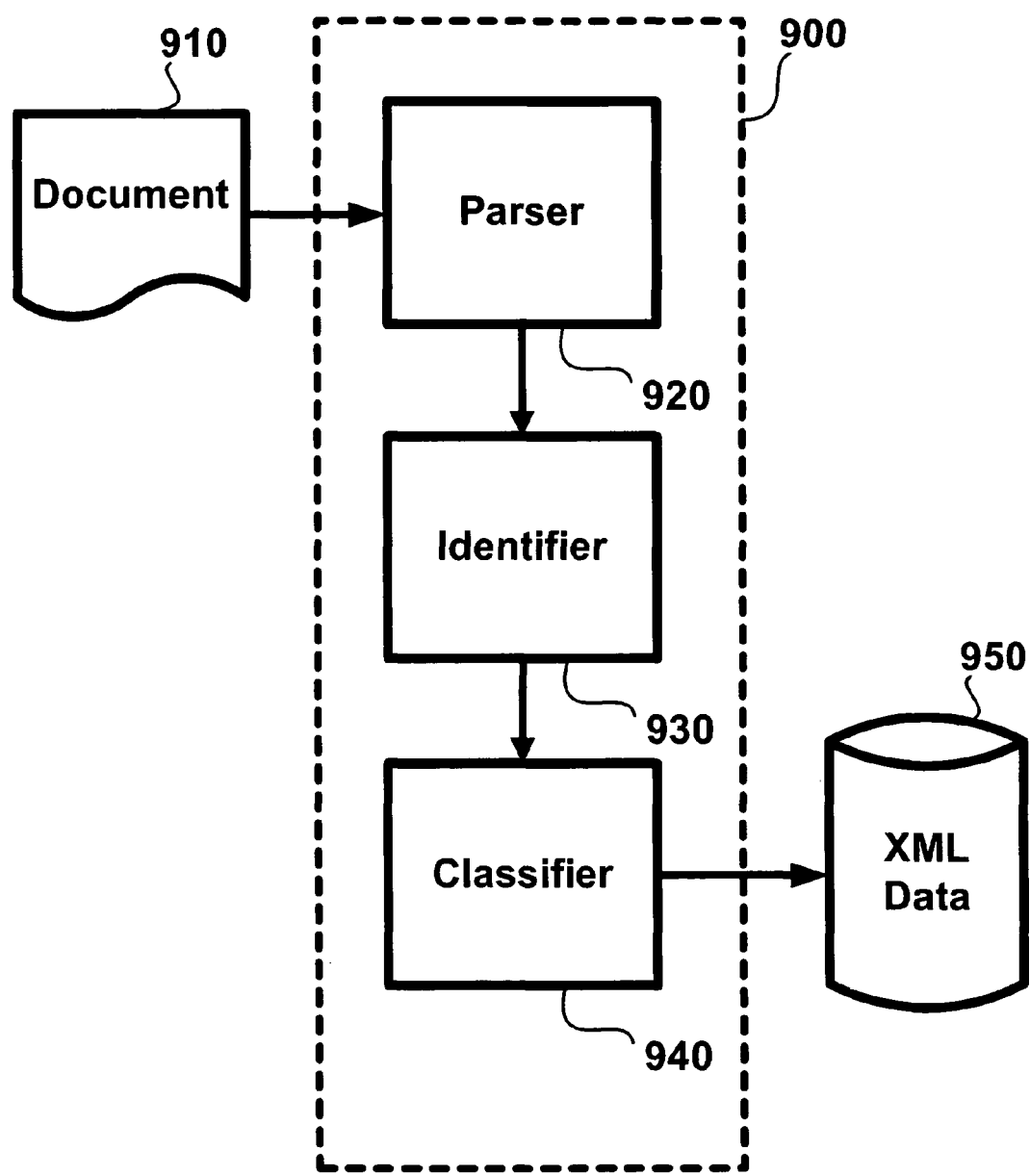
FIG. 9 is a system according to an embodiment of the present invention.

FIG. 9 is a block diagram of an exemplary system 900 according to an embodiment of the present invention. The system 900 is presented with a computer-readable or non-computer-readable document 910. The system 900 uses a parser 920 to scan the document for potential keys as previously described. The system also employs an identifier 930 that is programmed to use placement indicators, format indicators, font indicators, and other indicators to determine whether a potential key found by the parser is a key of interest. If it is a key of interest, a classifier 930 receives the key, classifies it according to indicators manifested by the key of interest, and stores the key in a structured format 950, such as in XML data. As previously described in connection with FIG. 8, the XML data may then be used to navigate to, from, and within the document 910.

While preferred and alternate embodiments of the invention have been illustrated and described, many changes can be made without departing from the spirit and scope of the invention. Accordingly, the scope of the invention is not limited by the disclosure of the preferred and alternate embodiments. Instead, the invention should be determined entirely by reference to the claims that follow.

What is claimed is:

1. A method of information searching in a document image derived from a scanner, the method comprising:
defining a key type of a referential key based on at least one type of contextual indicator of a plurality of contextual indicator types that is present in the document image;
parsing successive portions of the document image to locate a first type of contextual indicator of the plurality of contextual indicator types, wherein locating the first type of contextual indicator identifies a referential key within the document image;
identifying at least one portion of the document image that includes the located first type of contextual indicator;
determining if the located first type of contextual indicator is determinative of the defined key type of the referential key, without knowledge of text contained within the portion of the document image that includes the located first type of contextual indicator;
extracting characters from the referential key if the located first type of contextual indicator is determinative of the defined key type of the referential key;
parsing the portion of the document image that includes the located first type of contextual indicator to locate a second type of contextual indicator of the plurality of contextual indicator types if the located first type of contextual indicator is not determinative of the defined key type of the referential key;
determining that a combination of the located first type of contextual indicator and the located second type of contextual indicator located in the document image is determinative of the defined key type of the referential key; and
extracting characters from the referential key in response to the determining that the combination of the located first type of contextual indicator and the located second type of contextual indicator located in the document image is determinative of the defined key type of the referential key.

2. The method of claim 1, wherein the defined key type of the referential key comprises at least one of a title, a header, a footer, a document type, a document identifier, a subject identifier, a section identifier, a chapter identifier and a page number.

3. The method of claim 1, wherein the plurality of contextual indicator types comprises at least one of a placement indicator, a format indicator and a font indicator.

4. The method of claim 3, wherein the placement indicator includes a page position.

5. The method of claim 3, wherein the format indicator comprises a character pattern that includes at least one of a pattern of digits and a pattern of separators.

6. The method of claim 3, wherein the font indicator comprises at least one of a typeface, a boldface, an underlined text portion and a font size.

7. The method of claim 1, wherein the extracting the characters from the referential key comprises extracting the characters using an optical character recognition routine to scan the referential key after at least one of locating the first type of contextual indicator, and locating the combination of the located first type of contextual indicator and the located second type of contextual indicator, is determined to be determinative of the defined key type of the referential key.

8. The method of claim 1 further comprising storing the defined key type of referential key, a key location of the referential key within the document image, and the characters extracted from the referential key in a structured format according to the defined key type, the characters extracted, and the key location.

9. The method of claim 8, wherein the storing in the structured format comprises storing in a format that allows navigation to, from, and within the document image.

10. The method of claim 8, wherein the storing in the structured format comprises storing in an extensible markup language (XML) document.

11. The method of claim 1, wherein the defining the key type of the referential key based on the at least one type of contextual indicator comprises defining the key type of the referential key based on the at least one type of contextual indicator derived from knowledge including at least one of a general knowledge, a tribal knowledge, and a specific document format rule.

* * * * *